United States Patent
Witcher et al.

(10) Patent No.: US 9,755,428 B2
(45) Date of Patent: Sep. 5, 2017

(54) CURRENT LIMITER CIRCUIT SYSTEM

(71) Applicant: Sandia Corporation, Albuquerque, NM (US)

(72) Inventors: Joseph Brandon Witcher, Blacksburg, VA (US); Michael V. Bredemann, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 100 days.

(21) Appl. No.: 14/854,169

(22) Filed: Sep. 15, 2015

(65) Prior Publication Data

US 2016/0233666 A1  Aug. 11, 2016

Related U.S. Application Data

(60) Provisional application No. 62/112,767, filed on Feb. 6, 2015.

(51) Int. Cl.

| H02H 9/08 | (2006.01) |
|---|---|
| H02H 9/02 | (2006.01) |
| G05F 1/573 | (2006.01) |
| H02H 7/122 | (2006.01) |
| H02H 3/087 | (2006.01) |

(52) U.S. Cl.
CPC ............ *H02H 9/025* (2013.01); *G05F 1/573* (2013.01); *H02H 3/087* (2013.01); *H02H 7/1222* (2013.01); *H02H 7/1227* (2013.01); *H02H 9/02* (2013.01)

(58) Field of Classification Search
USPC .................. 361/86–87, 93.7–93.9
See application file for complete search history.

(56) References Cited

U.S. PATENT DOCUMENTS

| 4,672,302 | A | * | 6/1987 | DeShazo, Jr. | ...... H03K 17/0826 323/277 |
|---|---|---|---|---|---|
| 4,972,136 | A | * | 11/1990 | Banura | .................. G05F 1/573 323/275 |
| 5,181,155 | A | * | 1/1993 | Beg | .......................... H02H 3/44 361/87 |
| 5,548,467 | A | * | 8/1996 | Heaney | .................. H02H 3/087 323/277 |
| 6,466,422 | B2 | * | 10/2002 | Luo | ......................... G05F 1/575 361/18 |

* cited by examiner

*Primary Examiner* — Danny Nguyen
(74) *Attorney, Agent, or Firm* — Yee & Associates, P.C.; Samantha Updegraff

(57) ABSTRACT

An apparatus comprising a steady state sensing circuit, a switching circuit, and a detection circuit. The steady state sensing circuit is connected to a first, a second and a third node. The first node is connected to a first device, the second node is connected to a second device, and the steady state sensing circuit causes a scaled current to flow at the third node. The scaled current is proportional to a voltage difference between the first and second node. The switching circuit limits an amount of current that flows between the first and second device. The detection circuit is connected to the third node and the switching circuit. The detection circuit monitors the scaled current at the third node and controls the switching circuit to limit the amount of the current that flows between the first and second device when the scaled current is greater than a desired level.

15 Claims, 11 Drawing Sheets

CURRENT LIMITER CIRCUIT SYSTEM

RELATED PROVISIONAL APPLICATION

This application is related to and claims the benefit of priority of provisional U.S. Patent Application Ser. No. 62/112,767, filed Feb. 6, 2015, entitled "Low Loss, High Speed Current Limiting Switch", which is incorporated herein by reference.

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved circuit system and, in particular, to a method and apparatus for limiting the flow of currents in circuits. Still more particularly, the present disclosure relates to a method and apparatus for limiting a current that flows between a source and a load.

2. Background

Spikes in voltage, current, or both may result in damage to electrical circuits in devices. These devices may include, for example, a power supply, a processor unit, a sensor, or other devices.

A spike is a fast, short duration electrical transient that may occur in a voltage or a current in an electrical circuit. The spikes may be caused by short circuits, lightning strikes, electromagnetic pulses, or other sources.

For example, a power supply in a spacecraft may be temporarily short circuited when struck by the energetic particles found in a space environment. A current spike caused by this temporary short circuit may damage the power supply, the device struck by the energetic particle, or other circuits in other devices in the spacecraft.

In another example, a lighting strike may cause a spike in circuits for devices in a building. This spike may also damage circuits in these devices.

Currently, devices may be used to protect against surges. For example, a surge protector is a device that may be used to protect against the surges in voltage or currents. The surge protector may include diodes, fuses, or both diodes and fuses to protect against spikes in a device such as a power supply.

Fuses may be used to protect against the amount of current flowing but do not limit the direction of current flow. Diodes may be placed in series to protect fuses in the device against current flowing in an undesired direction in the power supply.

These diodes, however, consume additional power. Also, the diodes only limit the flow of current in one direction. The additional use of power may be more than desired, especially when a limited amount of power is available from a power source.

Also, in addition to using more power than desired, current devices used to protect against spikes are physically separate devices from those devices being protected. For example, a surge protector device may be connected to a second power supply, a load, or both the second power supply and the load.

In some cases, these surge protector devices may require more space than desired. Within a spacecraft, the amount of space available for devices is very limited as compared to terrestrial applications.

Therefore, it would be desirable to have a method and apparatus that take into account at least some of the issues discussed above, as well as other possible issues. For example, it would be desirable to have a method and apparatus that manage current flow that may flow in directions between two devices in a manner that solves a technical problem with power used, space needed, or both power used and space needed to manage the flow of current between two devices.

SUMMARY

An illustrative embodiment of the present disclosure provides an apparatus comprising a steady state sensing circuit, a switching circuit, and a detection circuit. The steady state sensing circuit is connected to a first node, a second node, and a third node. The first node is connected to a first device, the second node is connected to a second device, and the steady state sensing circuit causes a scaled current to flow at the third node. The scaled current is proportional to a voltage difference between the first node and the second node. The switching circuit limits an amount of current that flows between the first device and the second device. The detection circuit is connected to the third node and the switching circuit. The detection circuit monitors the scaled current at the third node and controls the switching circuit to limit the amount of the current that flows between the first device and the second device when the scaled current that is being monitored is greater than a desired level.

Another illustrative embodiment of the present disclosure provides a current limiter circuit system comprising a steady state sensing circuit, a switching circuit, a detection circuit, a transient sensing circuit, and an enable circuit. The steady state sensing circuit is connected a first node, a second node, and a third node. The first node is connected to a power source, the second node is connected to a load, and a scaled current flows at the third node. The scaled current is proportional to a voltage difference between the first node and the second node. The switching circuit limits an amount of current that flows between the power source and the load. The detection circuit is connected to an output of a steady state sensing circuit and the switching circuit. The detection circuit monitors the scaled current at the third node and controls the switching circuit to limit the amount of the current that flows between the power source and the load when the scaled current that is being monitored is greater than a desired level. The transient sensing circuit is connected to the first node, the second node, and the detection circuit. The transient sensing circuit limits the amount of the current that flows between the power source and the load, when the current is a transient current that has a level that is greater than desired. The enable circuit is connected to the steady state sensing circuit, the detection circuit, and the switching circuit. The enable circuit enables and disables the current that flows between the power source and the load.

Another illustrative embodiment of the present disclosure provides a method for limiting a current between a first device and a second device. A voltage difference between a first voltage at a first node connected to the first device and a second voltage at a second node connected to the second device is detected. A scaled current is generated at a third node. The scaled current is proportional to the voltage difference. The scaled current is monitored at the third node. The current flowing between the first device and the second device is limited when the scaled current is greater than a desired level.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account, that a circuit system that limits current flow may be implemented as part of a device, such as a source, a load, or some other device. This type of implementation may reduce the amount of space needed to limit undesired current flow between devices.

The illustrative embodiments also recognize and take into account that it may be desirable for a current limiter system to limit the peak current flow between two devices, such as a source and a load. Additionally, the illustrative embodiments recognize and take into account, that the current limiter system should react quickly, use as little power as possible, and have as small of a size as possible. The illustrative embodiments recognize that the currently available circuits for limiting current flow may be slower than desired, consume more power than desired, have a larger size than desired, exhibit a higher current overshoot than desired, or some combination of these undesired characteristics.

Thus, the illustrative embodiments provide a method and apparatus for limiting current flow between two devices. For example, an apparatus in one illustrative example may comprise a steady state sensing circuit, a switching circuit, and a detection circuit.

The steady state sensing circuit is connected to a first node, a second node, and a third node. The first node is connected to a first device, and the second node is connected to a second device. The steady state sensing circuit causes a scaled current to flow at the third node, and the scaled current is proportional to a voltage difference between the first node and the second node. The switching circuit is connected to the detection circuit, wherein the switch limits the amount of the current that flows between the source and the load. The detection circuit is connected to the third node and the switch, wherein the detection circuit monitors the scaled current at the third node and controls the switch to limit the amount of current that flows between the source and the load when the scaled current being monitored is greater than a desired level.

One illustrative example may be used to limit the current flow between two devices such as a power source and a load. The current flow may be limited in the direction from the source to the load, from the load to the source, or in both directions.

Figure 1:
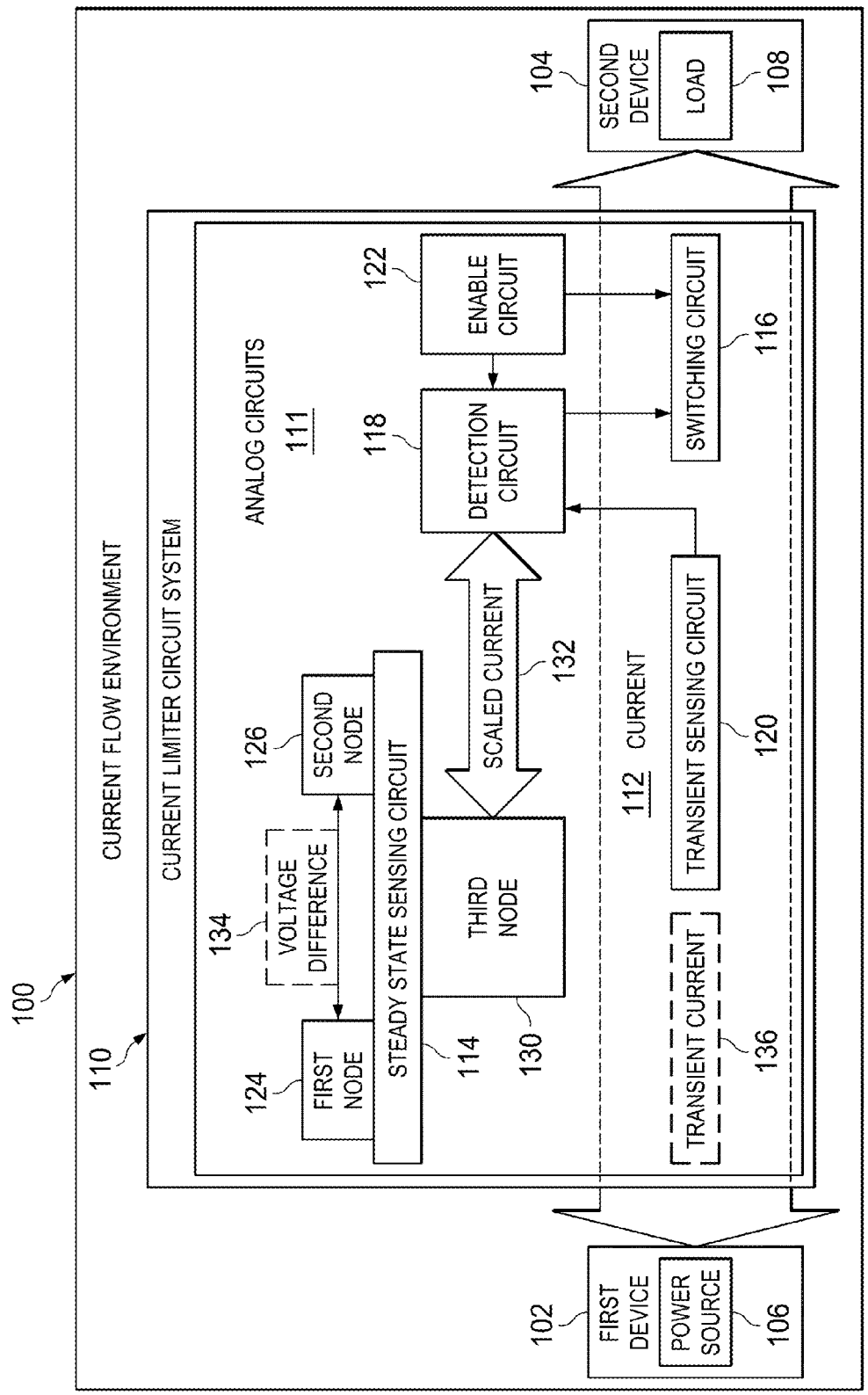
FIG. 1 is an illustration of a current flow environment in the form of a block diagram in accordance with an illustrative embodiment.

With reference now to the figures, and in particular, with reference to FIG. 1, an illustration of a current flow environment, in the form of a block diagram is depicted in accordance with an illustrative embodiment. In this illustrative example, current flow environment 100 includes first device 102 and second device 104. As depicted, first device 102 may be power source 106, and second device 104 may be load 108.

In this illustrative example, first device 102 and second device 104 are electronic devices. An electronic device is a device that, includes circuits and operates using electrical power. The circuits are formed from electronic components.

An electronic component is any discrete device or physical entity used to affect electrons or their associated fields. An electronic component may be, for example, a capacitor, an inductor, a resistor, a diode, a transistor, or some other suitable type of electronic component. These electronic components may be discrete electronic components, integrated as semiconductor integrated circuits, or in some other suitable form.

In the illustrative example, current limiter circuit system 110 is comprised of a group of analog circuits 111. As used herein, "a group of," when used with reference items, means one or more items. For example, "a group of analog circuits 111" is one or more of analog circuits 111.

An analog circuit is a circuit in which current or voltage may vary continuously with time to correspond to the information being represented. Additionally, current limiter circuit system 110 may be implemented as part of the device. For example, current limiter circuit system 110 may be implemented as part of at least one of power source 106 or load 108. This type of implementation reduces the amount of space as compared to other currently available current limiter circuit systems that are implemented as separate devices, use digital circuits, or some combination thereof.

As used herein, the phrase "at least one of," when used with a list of items, means different combinations of one or more of the listed items may be used and only one of each item in the list may be needed. In other words, "at least one of" means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; ten of item C; four of item B and seven of item C; or other suitable combinations.

As depicted, current limiter circuit system 110 may limit the flow of current 112 between first device 102 and second device 104. For example, current limiter circuit system 110 may limit the flow of current 112 from first device 102 to second device 104. Additionally, current limiter circuit system 110 also may limit the flow of current 112 from second device 104 to first device 102. In another illustrative example, current limiter circuit system 110 may limit the flow of current 112 in both directions.

As depicted, current limiter circuit system 110 includes a group of electronic components. As depicted, current limiter circuit system 110 includes steady state sensing circuit 114, switching circuit 116, detection circuit 118, transient sensing circuit 120, and enable circuit 122.

In the illustrative example, steady state sensing circuit 114 is connected to first node 124, second node 126, and third node 130. A node is a location in a circuit. The location may be, for example, an output to an electronic component, an input to an electronic component, the location on a line between electronic components, or some other suitable location in the circuit. In the illustrative example, a node may be a location where a voltage or a current is applied, measured, or some combination thereof.

As depicted, first node 124 is connected to first device 102, and second node 126 is connected to second device 104. In this example, steady state sensing circuit 114 causes scaled current 132 to flow at third node 130. For example, scaled current 132 flows in a direction out of steady state sensing circuit 114 and into detection circuit 118. As depicted, scaled current 132 is proportional to voltage difference 134 between first node 124 and second node 126.

In the illustrative examples, a first electronic component that is connected to a second electronic component is electrically connected. When a first electronic component, such as first node 124, is electrically connected to a second electronic component, such as first device 102, the first electronic component is connected to the second electronic component such that an electrical signal, such as a current, can be sent from the first electronic component to the second electronic component, the second electronic component to the first electronic component, or a combination of the two.

The first electronic component may be electrically connected to the second electronic component without any additional electronic components between the two electronic components. The first electronic component also may be electrically connected to the second electronic component by one or more other electronic components. For example, one electronic device may be electrically connected, to a second electronic component without any additional electronic components between the first electronic component and the second electronic component. In some cases, another electronic component, may be present between the two electronic components that are electrically connected to each other.

In this illustrative example, switching circuit 116 is connected to detection circuit 118. Switching circuit 116 limits the amount of current 112 that flows between first device 102 and second device 104.

As depicted, detection circuit 118 is connected to third node 130 and switching circuit 116. Detection circuit 118 monitors scaled current 132 at third node 130. Additionally, detection circuit 118 controls switching circuit 116 to limit the amount of current that flows between first device 102 and second device 104 when scaled current 132 monitored for by detection circuit 118 is greater than a desired level.

Transient sensing circuit 120 is connected to first node 124, second node 126, and detection circuit 118. As depicted, transient sensing circuit 120 is a circuit that redirects some of current 112 that flows between first device 102 and second device 104 through detection circuit 118 bypassing steady state sensing circuit 114 when the voltage difference between first node 124 and second node 126 induced by transient current 136 exceeds a voltage threshold. In other words, transient sensing circuit 120 limits the amount of current 112 that flows between power source 106 and load 108 when current 112 comprises transient current 136 that has a level that is greater than desired. In some illustrative examples, current 112 may also include a steady state current. In some illustrative examples, the redirection of some of current 112 may be into or out of detection circuit 118.

In this example, transient current 136 is a current that changes in magnitude over a short period of time. The change may be quick enough that steady state sensing circuit 114 may not change scaled current 132 quickly enough for detection circuit 118 to control switching circuit 116 in a manner that avoids damage to at least one of first device 102 or second device 104.

In this illustrative example, enable circuit 122 is connected to switching circuit 116. Enable circuit 122 is a circuit that enables and disables current 112 flowing between first device 102 and second device 104. As depicted, current limiter circuit system 110 controls the flow of current 112 in a direction selected from at least one of from first device 102 to second device 104 or from second device 104 to first device 102. Enable circuit 122 is also connected to detection circuit 118.

Thus, one or more components in current limiter circuit system 110 provide one or more technical solutions to manage current 112 that may flow between two devices. In particular, current limiter circuit system 110 may be used to limit the amount of current 112 that may flow in either direction between first device 102 and second device 104. The limit to current 112 flowing between first device 102 and second device 104 may reduce undesired effects from current 112 having a higher than desired level for at least one of first device 102 or second device 104. One or more components in current limiter circuit system 110 may solve the technical problem with power used, space needed, or both power used and space needed to manage the flow of current between two devices.

The illustration of current limiter circuit system 110 in current flow environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, transient sensing circuit 120 may be omitted in some illustrative examples. In another illustrative example, current limiter circuit system 110 may limit the flow of current 112 to one or more loads in addition to load 108.

In still another illustrative example, the flow of current between one or more devices in addition to or in place of first device 102 and second device 104 may be limited using current limiter circuit system 110. For example, current limiter circuit system 110 may be used to control the flow of current 112 between power source 106, load 108, and an additional load.

Further, in these illustrative examples, current limiter circuit system 110 may be implemented using discrete electronic components, integrated circuits, or in another suitable manner. In one illustrative example, current limiter circuit system 110 may be implemented as a circuit system in power source 106. In another illustrative example, current limiter circuit system 110 may be implemented as a circuit system in load 108. In another illustrative example, current limiter circuit system 110 may be located in an integrated circuit or in a chip that is connected to power source 106, which may be located in another chip or physical device.

In the illustrative examples, FIGS. 2-5 described below are for a current limiter circuit system configured for high side voltage sense. High side voltage sense means that the current being monitored and limited is at a higher voltage than the voltage provided by enable circuit 122. Enable circuit 122 for a high side voltage sense is a circuit that enables and disables current 112 flowing between first device 102 and second device 104 by providing, withdrawing, or withholding a voltage lower than the voltage of either first node 124 or second node 126. Similarly, low side voltage sense means that the current being monitored and limited is at a lower voltage than the voltage provided by enable circuit 122. Enable circuit 122 for a low side voltage sense is a circuit that enables and disables current 112 flowing between first device 102 and second device 104 by providing, withdrawing, or withholding a voltage higher than the voltage of either first node 124 or second node 126.

Figure 2:
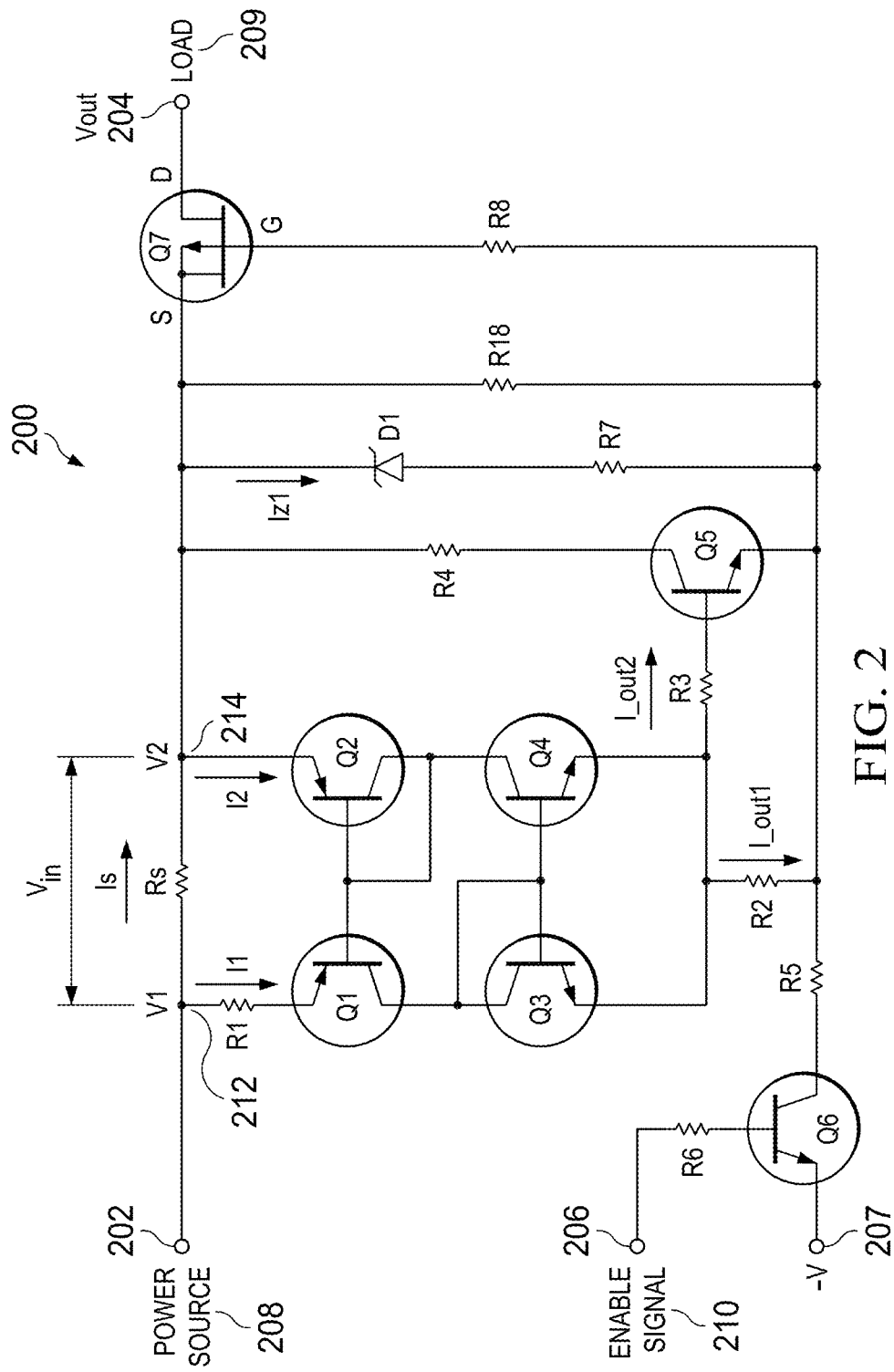
FIG. 2 is an illustration of a portion of a current limiter circuit system in accordance with an illustrative embodiment.

Turning first to FIG. 2, an illustration of a portion, of a current limiter circuit system is depicted in accordance with an illustrative embodiment. In this illustrative example, current limiter circuit system 200 is an example of one implementation of current limiter circuit system 110 shown in block form in FIG. 1. As depicted, current limiter circuit system 200 is a unidirectional, fast current limiter system with a high side voltage sense.

In the illustrative examples, the same reference numeral or alpha numeric reference to an element may be used in more than one figure. This reuse of a reference numeral or alpha numeric reference in different figures represents the same element in the different figures.

As depicted, current limiter circuit system 200 has connector 202, connector 204, connector 206, and connector 207. As used herein, a connector is a location in a circuit where a connection may be made to another electronic component, a device, a signal, a current, a voltage, or some other suitable component.

As depicted, connector 202 is connected to power source 208 and connector 204 is connected to load 209. Connector 206 is connected to enable signal 210 and connector 207 is connected to lower voltage –V.

In the illustrative example, connections to these connectors may be made by direct or indirect connections. An indirect connection may include other electronic components that form part of the electrical connection.

As depicted, resistor R1, transistor Q1, transistor Q2, transistor Q3, and transistor Q4 form a current mirror system that is an example of an implementation of steady state sensing circuit 114 shown in block form in FIG. 1. The current mirror system is a current source in this illustrative example.

This current mirror system forms a steady-state portion of current limiter circuit system 200. The current mirror system may be used to detect an excessive amount of current for current Is flowing from power source 208 to load 209 in this illustrative example.

Transistor Q1 and transistor Q2 form a first current mirror in the current mirror system. In this example, the first current mirror is a high side current mirror, in which current I1, flowing through resistor R1 and into the emitter of transistor Q1, is a control current that is mirrored in current I2 flowing into the emitter of transistor Q2. Current I2 is substantially the same as current I1.

As depicted in this current mirror, the control current is current I1 flowing through the leg of the mirror with the resistor, which is resistor R1 in this current mirror. The mirrored current is current I2, which flows though the leg of the current mirror without a resistor.

As depicted, transistor Q3 and transistor Q4 form a second mirror in the current mirror system. In this example, the second current mirror is a low side current mirror, in which the control current, current I2 from the high side current mirror flowing out of the collector of transistor Q1 and out of the emitter of transistor Q4, is mirrored as the current flowing out of the emitter of transistor Q3. The current flowing out of the emitter of transistor Q3 is substantially the same as current I2.

In the illustrative example, node 212 has voltage V1 and corresponds to first node 124 in FIG. 1. Node 214 has voltage V2 and corresponds to second node 126 in FIG. 1.

As depicted, transistor Q5, resistor R2, resistor R3, and resistor R4 are examples of electronic components that may be used to implement detection, circuit 118 in FIG. 1. Transistor Q6, resistor R5, and resistor R6 are electronic components for an example implementation of enable circuit 122. In this depicted example, the collector of transistor Q6 is connected to transistor Q5 in the switching circuit through resistor R5. The base of transistor Q6 is connected to enable signal 210 at connector 206 through resistor R6. In the illustrative example, transistor Q7, zener diode D1, resistor R7, resistor R8, and resistor R18 are examples of electronic components that may be used to implement switching circuit 116 in FIG. 1.

In this illustrative example, transistors Q1-Q6 are bipolar junction (BJT) transistors, and transistor Q7 is a P-channel field-effect transistor (FET). Each bipolar junction transistor has a collector, an emitter, and a base. The field-effect transistor has a source, a drain, and a gate.

Voltage V1 at node 212 is higher than voltage V2 at node 214 in this example. The voltage difference between voltage V1 and voltage V2 is voltage $V_{in}$ for the current mirror system.

As depicted, resistor Rs is a sense resistor. Current Is flows through resistor Rs. Voltage $V_{in}$ is the voltage across resistor Rs. In this illustrative example, current Is is the current that may be limited.

In this example, resistor R1 is connected to node 212 and the emitter of transistor Q1. Resistor R2 is connected to the emitter of transistor Q3 and the emitter of transistor Q4. Resistor R3 is connected to the emitter of transistor Q3 and the emitter of transistor Q4.

As shown, as long as voltage $V_{in}$ is greater than or equal to zero, the voltage at the emitter of transistor Q1 is approximately the same as the voltage at the emitter of transistor Q2, and voltage $V_{in}$ is the same as the voltage across resistor R1. In this depicted example, the first current mirror has a configuration that ensures that the current I1 flowing into the emitter of transistor Q1 is mirrored as current I2 flowing into the emitter of transistor Q2. Current I2 is substantially the same as current I1.

Similarly, in the second current mirror, formed by transistor Q3 and transistor Q4, the current I2 from the first current mirror, flowing out of the emitter of transistor Q3, is mirrored as the current flowing out of the emitter of transistor Q4. As depicted, the current flowing out of the emitter of transistor Q3 is substantially the same as current I2 flowing from the first current mirror.

In this example, current I_out1 flows through resistor R2, and current I_out2 flows through resistor R3. The sum of current I_out1 flowing through, resistor R2 and current I_out2 flowing through resistor R3 is about two times that of current I1 flowing through resistor R1. In this illustrative example, the sum of current I_out1 and current I_out2 is an example of scaled current 132 in FIG. 1.

In this illustrative example, current I_out1 and current I_out2 can be orders of magnitude smaller than that of the sensed current, current Is. The configuration in the illustrative example is one manner in which less power may be used by current limiter circuit system 200. These two source currents, current I_out1 and current I_out2, are generated based on the resistance value of resistor R1 and voltage $V_{in}$, the voltage difference from node 212 and node 214.

This example implementation of steady state sensing circuit 114 in FIG. 1 using a current mirror system dissipates very little power as compared to currently used current limiting devices. Also, this configuration uses lower voltage –V at connector 207 that is below that of the load by at least the amount, necessary to turn on transistor Q7.

As voltage $V_{in}$ increases during operation of current limiter circuit system 200, the output source current, current I_out1, also increases. As current I_out1 increases, the voltage across resistor R2 increases until the voltage across resistor R2 approaches the base to emitter voltage drop across transistor Q5.

Further increases in the voltage drop across resistor R2 cause current I_out2 to flow through resistor R3 and into the base of transistor Q5. In turn, the flow of current I_out2 into the base of transistor Q5 causes transistor Q5 to begin to turn off transistor Q7 by reducing the voltage across R18, limiting the flow of current Is to the load.

In this illustrative example, resistor R18 is connected to the gate of transistor Q7 through resistor R8 and to the source of transistor Q7. Resistor R18 is included to bleed off voltage across zener diode D1 when enable signal 210 at the base of Q5 is disabled.

In the illustrative example, resistor R1 and transistors Q1-Q4 comprise the steady state component that drives resistor R2, resistor R3, and the base of transistor Q5 in the detection circuit. Resistor Rs, resistor R1, resistor R2, and resistor R3 may be selected such that a desired excessive level of current Is from power source 208 to load 209 activates transistor Q5 and causes transistor Q7 to limit the flow of current Is.

Transistor Q6 operates to enable and disable current Is flowing from power source 208 to load 209. As depicted, enable signal 210 is applied to connector 206 and controls the operation of transistor Q6. In this example, the resistance value of resistor R5 is selected to have a value that is small enough to pass the maximum normal operating current from the current source, zener diode current Iz flowing through zener diode D1, and the current flowing through resistor R18. The maximum normal operating current is current I_out1 in this example. The value of resistor R5 is also selected, to be large enough to reduce power dissipation.

As depicted, zener diode D1 protects transistor Q7 from a gate to source voltage breakdown. Resistor R7 and resistor R8 are optional and provide current limiting protection for zener diode D1 and for the gate of transistor Q7.

The output voltage, voltage Vout to load 209 at connector 204, begins to drop as transistor Q7 limits current Is flowing to load 209. Depending on the power rating of transistor Q7 or the intended application, having a fault condition that persists may be undesirable. In this case, voltage Vout at connector 207 may be sensed. When voltage Vout drops below a desired level, a feedback occurs that disables enable signal 210 that is input to connector 206 and removes power from load 209. Any currently used feedback method may be used. Alternatively, without a feedback, the output voltage, voltage Vout, drops to a level that allows only the desired maximum current to pass to the load.

In current limiter circuit, system 200 in FIG. 2, the voltage across resistor Rs is sensed using current mirrors. A detection circuit in current limiter circuit system 200 determines whether the current generated by the current mirrors exceeds a threshold. In the example, a determination is made as to whether the voltage across R2 from base to emitter is large enough to turn on transistor Q5. The sensed current is limited by driving the switching circuit with transistor Q5 in the detection circuit. Resistor R4 provides current limiting protection for transistor Q5. Resistor R4 is much smaller in resistance value than resistor R18 to ensure that the current flowing through the collector of transistor Q5 has the desired effect of lowering the source to gate voltage across transistor Q7 necessary to reduce the current flowing through resistor Rs.

Figure 3:
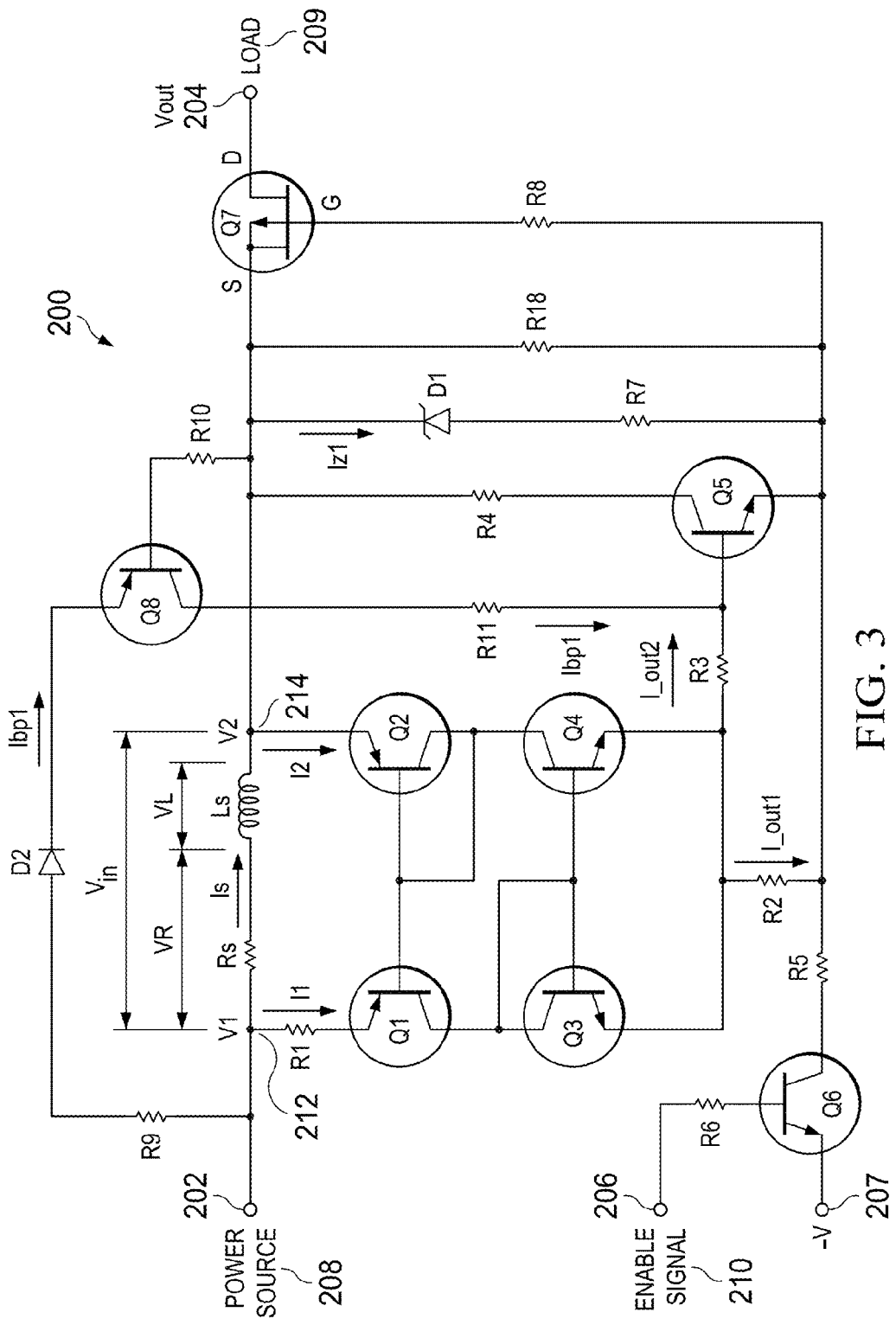
FIG. 3 is an illustration of a current limiter circuit system with a transient sensing circuit in accordance with an illustrative embodiment.

Turning next to FIG. 3, an illustration of a current limiter circuit system with a transient sensing circuit is depicted in accordance with an illustrative embodiment. Depending on the implementation, a faster response to currents that may exceed a maximum desired current may be desired than provided by transistor Q1, transistor Q2, transistor Q3, and transistor Q4 in the current limiter circuit system 200. These transistors may be slower than desired when the bias current, current I_out1, is small enough to have a desired level of power use.

In this depicted example, current limiter circuit system 200 from FIG. 2 is shown in FIG. 3 with additional electronic components. The additional electronic components are for an example implementation of transient sensing circuit 120 in FIG. 1. In this illustrative example, inductor Ls, transistor Q8, resistor R9, resistor R10, resistor R11, and diode D2 are electronic components that may be used to implement transient sensing circuit 120 as shown in block form in FIG. 1.

As depicted, inductor Ls is connected in series with resistor Rs between node 212 and node 214. Inductor Ls is selected to reduce instantaneous current change in current Is. In this manner, instantaneous current changes to the load are reduced or prevented. Further, inductor Ls adds current slew rate in the shutdown criteria.

In this manner, the addition of inductor Ls to current limiter circuit system 200 may reduce or eliminate discontinuities in the magnitude of current Is flow between power source 208 and load 209. Additionally, inductor Ls adds the slew rate to the voltage criteria for the scaled output current, the sum of current I_out1 and current I_out2, from the steady state sensing circuit formed by the current mirrors.

Further, inductor Ls alone may function as a transient current limiter since current Is flowing through inductor Ls cannot change instantaneously. In an illustrative example, replacing resistor Rs with inductor Ls converts the current limiter to a current rate limiter that clips the derivative of current Is to a desired maximum value.

In the illustrative example, voltage VL across inductor Ls increases with an increasing rate of change (d/dt) in current Is through inductor Ls (VL=Ls*dIs/dt). Voltage VL is added to the voltage drop (VR=Is*Rs) across resistor Rs to form the input voltage, Vin=VR+VL, for both the steady state sensing circuit and the transient sensing circuit to output the scaled current I_out2 and the transient bypass current Ibp1, both of which drive transistor Q5 in the detection circuit.

As shown in this figure, transistor Q8, resistor R9, resistor R10, resistor R11, and diode D2 form a circuit in the form of a voltage clamp for the transient sensing circuit. This voltage clamp redirects a portion of current Is that flows through resistor Rs and inductor Ls. This redirection of transient bypass current Ibp1 flowing through resistor R11 and into the base of transistor Q5 occurs when voltage $V_{in}$, the sensed voltage, approaches a couple of diode drops. In this example, the diode drops are the sum of the voltages across diode D2 and the internal emitter to base voltage drop characteristic of a typical PNP bipolar junction transistor, such as transistor Q8.

In this manner, some of the flow of current Is between power source 208 to load 209 is redirected into transistor Q5 in the detection circuit when a voltage exceeds a voltage drop of about, two diode voltage drops. This redirection of current Is immediately starts to turn off transistor Q7 in the switching circuit. This process bypasses the normal detection process of waiting until the voltage across resistor R2 is large enough to activate transistor Q5. In this depicted example, detection occurs in the voltage clamp and transient bypass current Ibp1 drives transistor Q5 that turns off transistor Q7.

In this manner, transistor Q7 may be turned off more quickly. Thus, with this voltage clamp, the delay in response time through the current mirror system formed by transistors Q1-Q4 is bypassed and the delay in transistor Q7 turn off time may be reduced.

Figure 4:
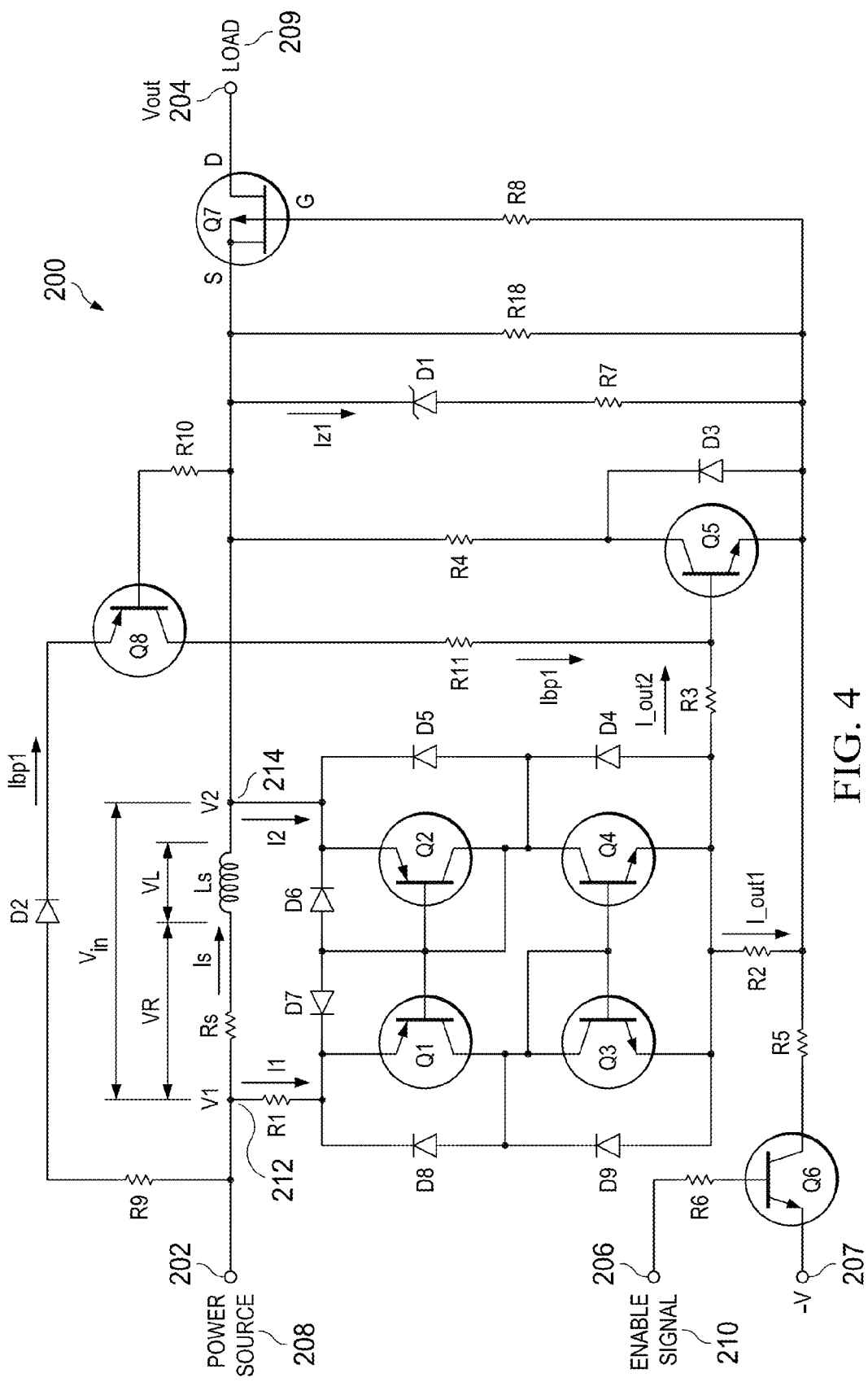
FIG. 4 is an illustration of a current limiter circuit system with protection for transistors in accordance with an illustrative embodiment.

With reference next to FIG. 4, an illustration of a current limiter circuit system with protection for transistors is depicted in accordance with, an illustrative embodiment. In this example, current limiter circuit system 200 from FIG. 3 is shown with additional electronic components. This depiction of current limiter circuit system 200 in this figure is a unidirectional, fast current limiter system with a high side voltage sense.

In the illustrative example, transistors Q1-Q5 may be susceptible to damage arising from sudden voltage reversals upon shorts to voltages that are lower than that of the load voltage of load 209. As depicted, diode D3, diode D4, diode D5, diode D6, diode D7, diode D8, and diode D9 are oriented in directions across transistors Q1-Q5 to protect transistors Q1-Q5 from reverse voltage damage. As depicted, diodes D1-D8 provide reverse voltage protection from shorts to lower voltages at load 209. In the illustrative example, if a short persists, current limiter circuit system 200 allows only the desired amount of current to pass by reducing the output voltage at load 209 to an appropriate voltage level determined by the resistance of the fault at connector 204.

Figure 5:
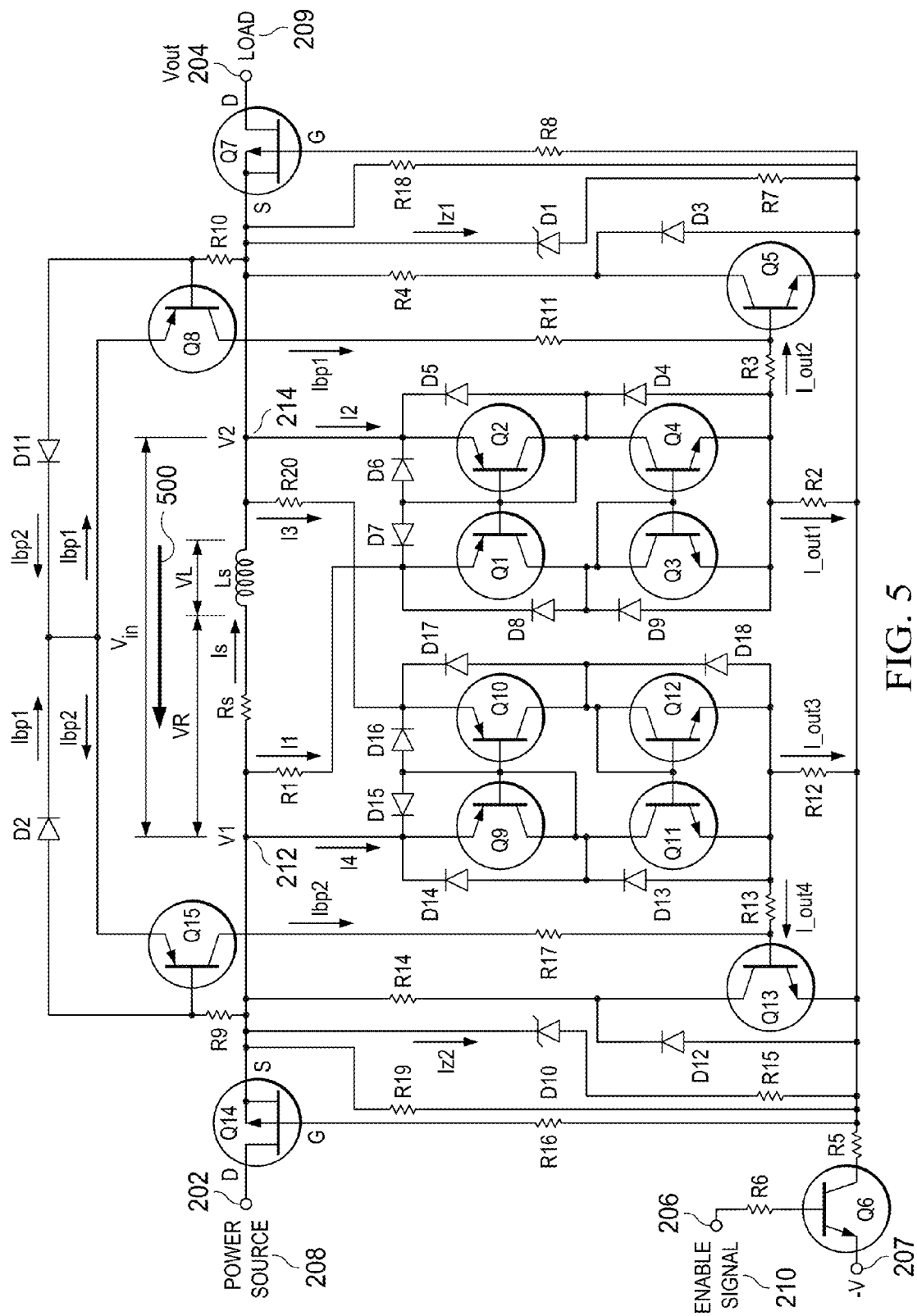
FIG. 5 is an illustration of a current limiter circuit system that limits current in two directions in accordance with an illustrative embodiment.

Turning now to FIG. 5, an illustration of a current limiter circuit system that limits current in two directions is depicted in accordance with an illustrative embodiment. In this example, current limiter circuit system 200 from FIG. 4 is shown with additional electronic components that operate to provide bi-directional limiting of current flow between power source 208 and load 209. In other words, the flow of current Is may be limited in both directions, from power source 208 to load 209 and from load 209 to power source 208.

Load 209 may have a large capacitance. The large capacitance allows a large amount of charge to be stored that is high enough to contribute to large current spikes. In the event of a temporary power short or voltage transient prior to the switch, current Is can flow from load 209 to power source 208 in the direction of arrow 500. This flow of current Is in the direction of arrow 500 may contribute to damaging electronic components upstream. The electronic components may include fuses in power source 208.

A limit on current Is flowing in the reverse direction as shown by arrow 500 from load 209 to power source 208 reduces this problem. Thus, current limiter circuit system 200 with the additional electronic components shown in FIG. 5 provides for bidirectional current limiting with a high side voltage sense.

In this illustrative example, transistor Q9, transistor Q10, transistor Q11, and transistor Q12 are part of a second current mirror system. As depicted, transistor Q9 and transistor Q10 form a first current mirror, and transistor Q11 and transistor Q12 form a second current mirror.

In this example, the first current mirror is a high side current mirror, in which the control current, current I3 flowing through resistor R20 and into the emitter of Q10, is mirrored as current I4 flowing into the emitter of Q9. Current I4 is substantially the same as current I3. In this example, the first current mirror has a configuration that ensures that current I3 flowing into the emitter of transistor Q10 is the same as current I4 flowing into the emitter of transistor Q9.

Similarly, a second current mirror is formed by transistor Q11 and transistor Q12. In this example, the second current mirror is a low side current mirror, in which the control current, current I4 from the high side current mirror flowing out of the collector of Q9 and out of the emitter of Q11, is mirrored as the current flowing out of the emitter of transistor Q12. The current flowing out of the emitter of transistor Q12 is substantially the same as current I4.

In this example, current I_out3 flows through resistor R12, and current I_out4 flows through resistor R13. The sum of current I_out3 flowing through resistor R12 and current I_out4 flowing through resistor R13 is about two times that of current I3 flowing through resistor R20. In this illustrative example, the sum of current I_out3 and current I_out4 is an example of scaled current 132 in FIG. 1.

As depicted, transistor Q13, resistor R12, resistor R13, and resistor R14 are examples of additional electronic components that may be used to implement detection circuit 118 in FIG. 1. These electronic components detect a flow of current Is in the direction of arrow 500 that is greater than a desired amount.

Transistor Q14, zener diode D10, resistor R15, resistor R16, and resistor R19 are examples of additional electronic components that may be used to implement switching circuit 116 in FIG. 1. These electronic components are configured to limit the flow of current Is in the direction of arrow 500.

In another illustrative example, switching circuit 116 may be implemented using different types of devices. For example, switching circuit 116 may include at least one of a bipolar junction transistor, a field effect transistor, a relay, or other electronic switching device. Switching circuit 116 also may include other electronic components that work with one or more electronic switching devices.

In this illustrative example, transistor Q15, diode D11, and resistor R17 are additional electronic components that may be used in conjunction with resistor R9 and resistor R10 to implement transient sensing circuit 120 as shown in block form in FIG. 1 for transient currents in the direction of arrow 500 shown in FIG. 5. Transistors Q9-Q13 are bipolar junction transistors in this illustrative example. As depicted, transistor Q14 is a field effect transistor.

As shown in this illustrative example, diode D12, diode D13, diode D14, diode D15, diode D16, diode D17, and diode D18 are oriented in directions across transistors Q9-Q13 to protect transistors Q9-Q13 from reverse voltage damage.

In this illustrative example, transistors Q9-Q12 form a second voltage-controlled current source. As depicted, resistor R20 and transistors Q9-Q12 comprise the steady state component that drives resistor R12, resistor R13, and the base of transistor Q13 upon detection of an excessive level of current Is flowing in the direction of arrow 500. The level of current Is that is selected as undesirable may be made through a selection of values for resistor Rs, resistor R20, resistor R12, and resistor R13. When an excessive amount of current is detected, transistor Q13 turns off transistor Q14 and limits the flow of current Is from load 209 back to power source 208 in the direction of arrow 500.

In this example, resistor R9, resistor R10, resistor R17, diode D11, and transistor Q15 form the transient component of the reverse current limiter for the flow of current Is in the direction of arrow 500. These electronic components form a voltage clamp that, redirects some of the reverse current into the base of transistor Q13 whenever voltage $V_{in}$ approaches a couple of diode drops.

As depicted, FIGS. 6-11 as described below are for a current limiter circuit system that is configured for a low side voltage sense. In these figures, transistors are shown with the same reference designation indicating that the transistors have the similar function with the same effect as the transistors with the same reference designations in FIGS. 2-5. These transistors, however, may be implemented using different types of transistors depending on whether the transistors are used for a high side voltage sense or a low side voltage sense to provide the same effect.

Figure 6:
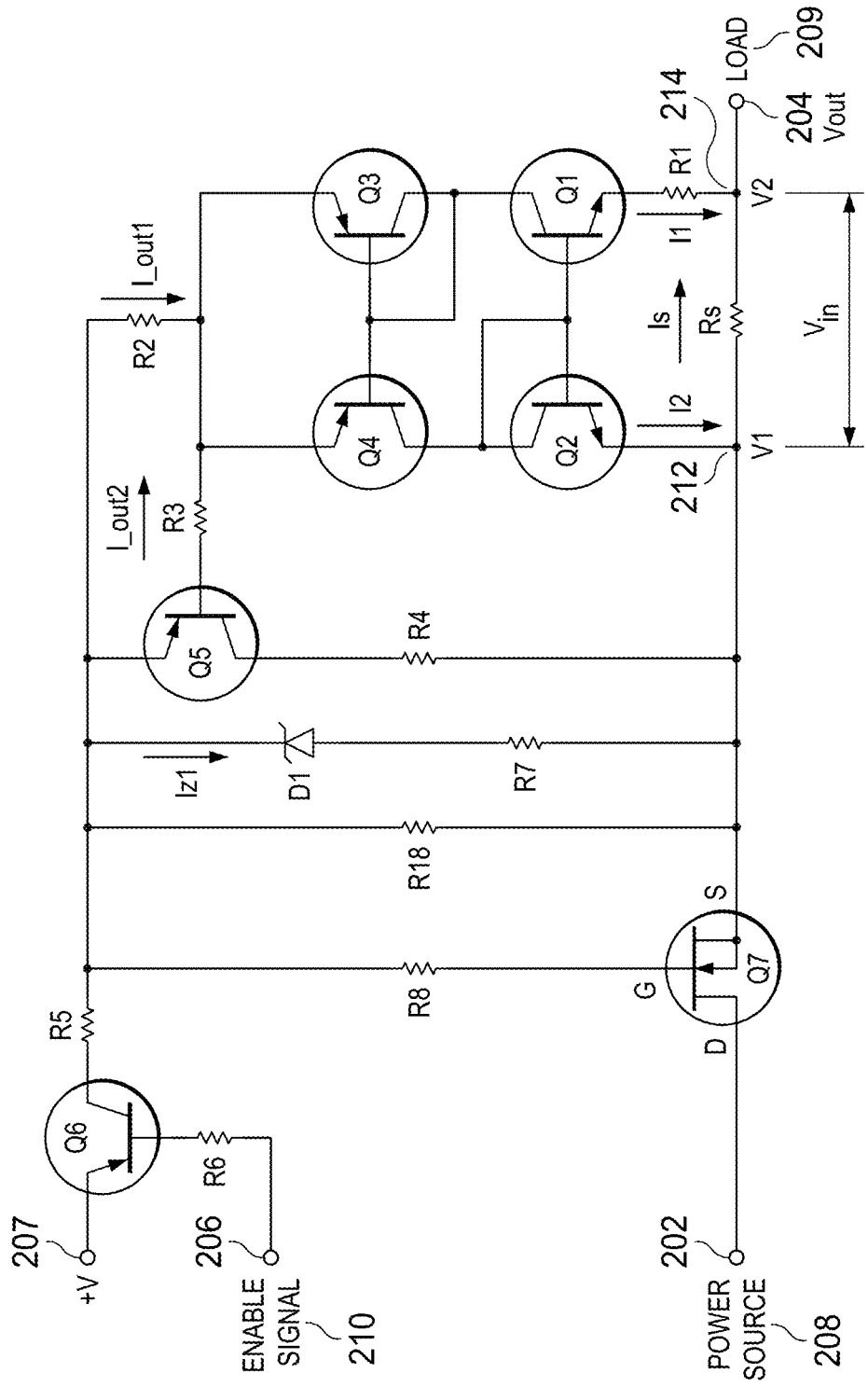
FIG. 6 is an illustration of a portion of a current limiter circuit system in accordance with an illustrative embodiment.

With reference now to FIG. 6, an illustration of a portion of a current limiter circuit system, is depicted in accordance with an illustrative embodiment. In this illustrative example, current limiter circuit system 200 is shown in a configuration for another implementation of current limiter circuit system 110 shown in block form in FIG. 1. As depicted, current limiter circuit system. 200 is a unidirectional current limiter circuit system with a low side voltage sense.

In this depicted example, the current mirror system formed by transistor Q1, transistor Q2, transistor Q3, and transistor Q4 is a current sink. As seen in this example, voltage $V_{in}$ is the voltage difference between voltage V1 at node 212 and voltage V2 at node 214.

As shown, the sum of current I1 and current I2 is approximately equal to the sum of current I_out1 and current I_out2. Half of the latter current sum flows into the emitter of transistor Q3 and half of the latter current sum flows into the emitter of transistor Q4. The sum of current I_out1 and current I_out2 is proportional to the voltage difference sensed, between voltage V1 and voltage V2, as long as the voltage difference is positive. Otherwise, current I_out1 and current I_out2 are zero.

As depicted, the sum of current I_out1 and current I_out2 is an example of scaled current 132 in FIG. 1. In this illustrative example, connector 207 is connected to higher voltage +V instead of lower voltage −V in FIGS. 2-5, in which the high side voltage sense configuration of current limiter circuit system 200 is shown.

In this illustrative example, transistor Q1 and transistor Q2 form a first current mirror, and transistor Q3 and transistor Q4 form a second current mirror. The first current mirror is a low side current mirror and the second current mirror is a high side current mirror in this example. These current mirrors are another example of an implementation for steady state sensing circuit 114 in FIG. 1.

As depicted, transistor Q5, resistor R2, resistor R3, and resistor R4 are examples of electronic components that may be used to implement detection circuit 118 in FIG. 1. Transistor Q6, resistor R5, and resistor R6 are electronic components for an example implementation of enable circuit. 122. In the illustrative example, transistor Q7, zener diode D1, resistor R7, resistor R8, and resistor R18 are examples of electronic components that may be used to implement switching circuit 116 in FIG. 1, In this example, the resistors and diodes in current limiter circuit system 200 shown in FIG. 6 are the same as those shown in FIG. 2. In FIG. 6, the transistors are shown with the same reference designation indicating that the transistors have a similar function and have the same effect as in FIG. 2.

For example, transistor Q1 and transistor Q2 are PNP bipolar junction transistors in FIG. 2, but take the form of NPN bipolar junction transistors in FIG. 6. As another example, transistor Q3, transistor Q4, transistor Q5, and transistor Q6 are NPN bipolar junction transistors in FIG. 2, but are PNP bipolar junction transistors in FIG. 6. In yet another example, transistor Q7 is a P-channel field effect transistor in FIG. 2, but an N-channel field effect transistor in FIG. 6. These electronic components are in a different configuration for a low side voltage sense as compared to the high side voltage sense shown for these electronic components in FIG. 2.

The voltage clamps use PNP bipolar junction transistors or NPN bipolar junction transistors, respectively. The current mirror control is from top down in the high side current sense and from bottom up in the low side current sense. These different electronic components may be configured for either a high side voltage sense or a low side voltage sense depending on the desired implementation for an illustrative embodiment.

Figure 7:
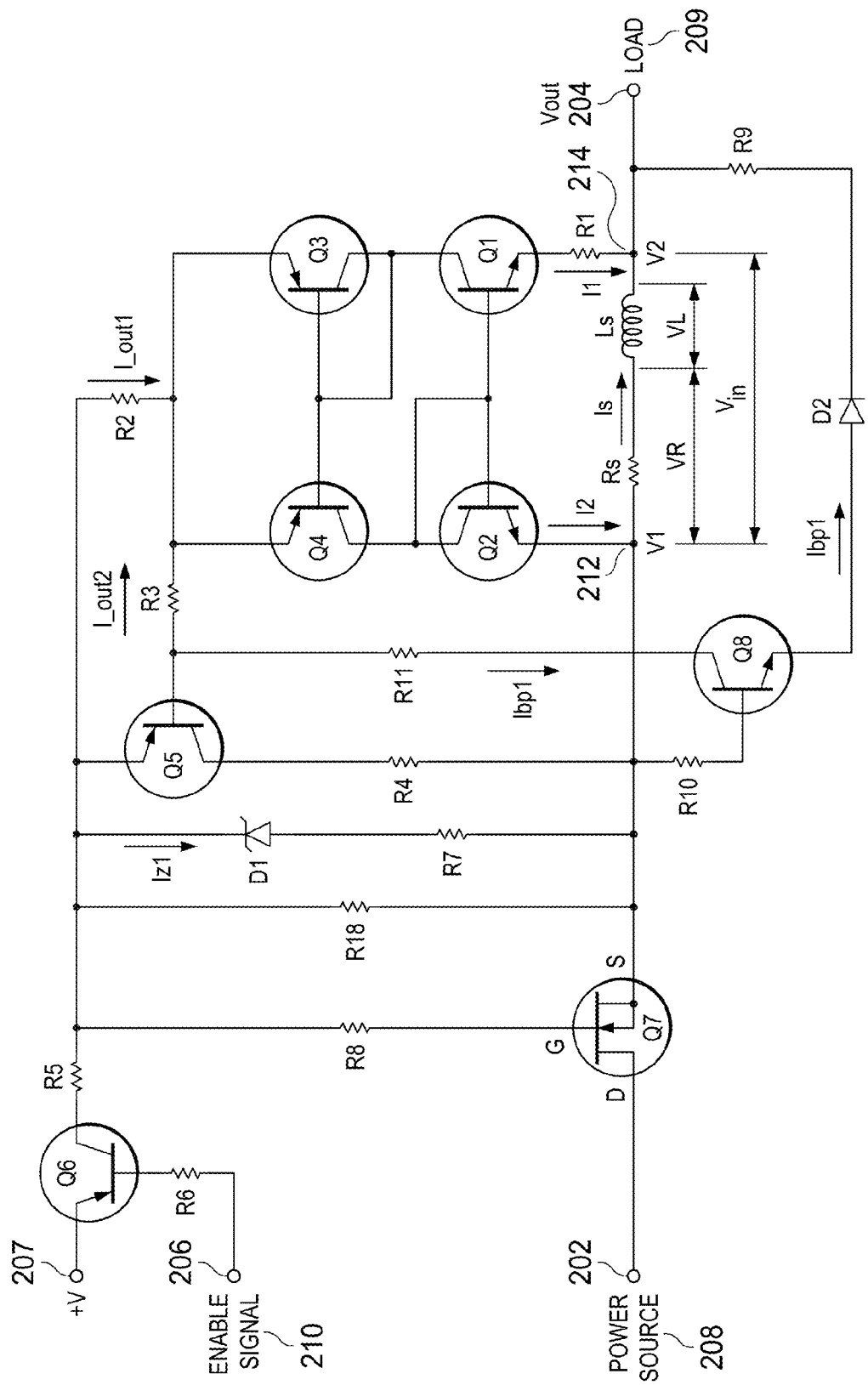
FIG. 7 is an illustration of a current limiter circuit system with a transient sensing circuit in accordance with an illustrative embodiment.

Turning next to FIG. 7, an illustration of a current limiter circuit system with a transient sensing circuit is depicted in accordance with an illustrative embodiment. In this illustrative example, inductor Ls, transistor Q8, resistor R9, resistor R10, resistor R11, and diode D2 are electronic components that may be used to implement transient sensing circuit 120 as shown in block form in FIG. 1.

Figure 8:
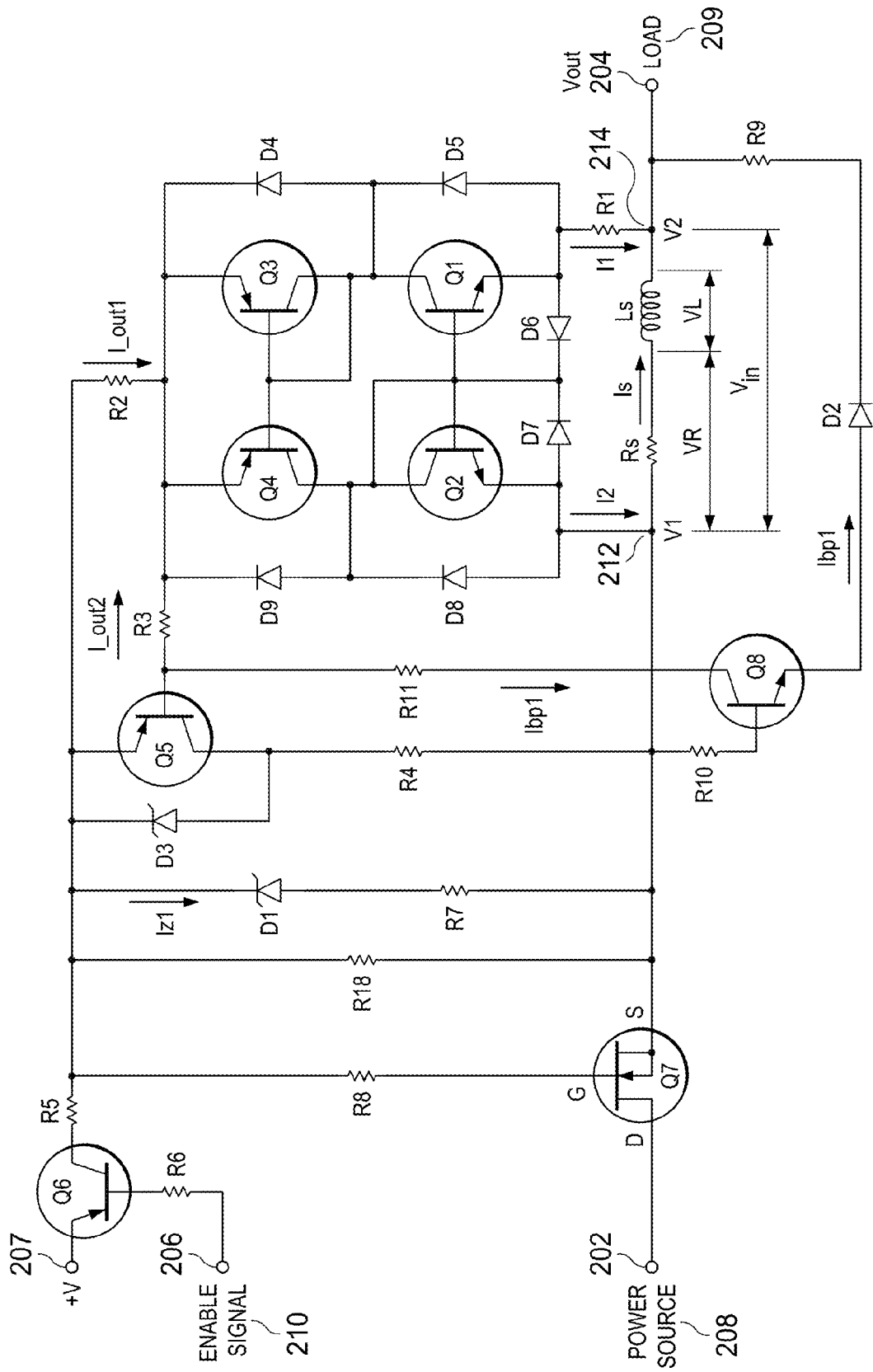
FIG. 8 is an illustration of a current limiter circuit system with protection for transistors in accordance with an illustrative embodiment.

With reference next to FIG. 8, an illustration of a current limiter circuit system with protection for transistors is depicted in accordance with an illustrative embodiment. As depicted, diode D3, diode D4, diode D5, diode D6, diode D7, diode D8, and diode D9 are oriented in directions across transistors Q1-Q5 to protect transistors Q1-Q5 from reverse voltage damage. As depicted, diodes D1-D8 provide reverse voltage protection from shorts to higher voltages at load 209.

Figure 9:
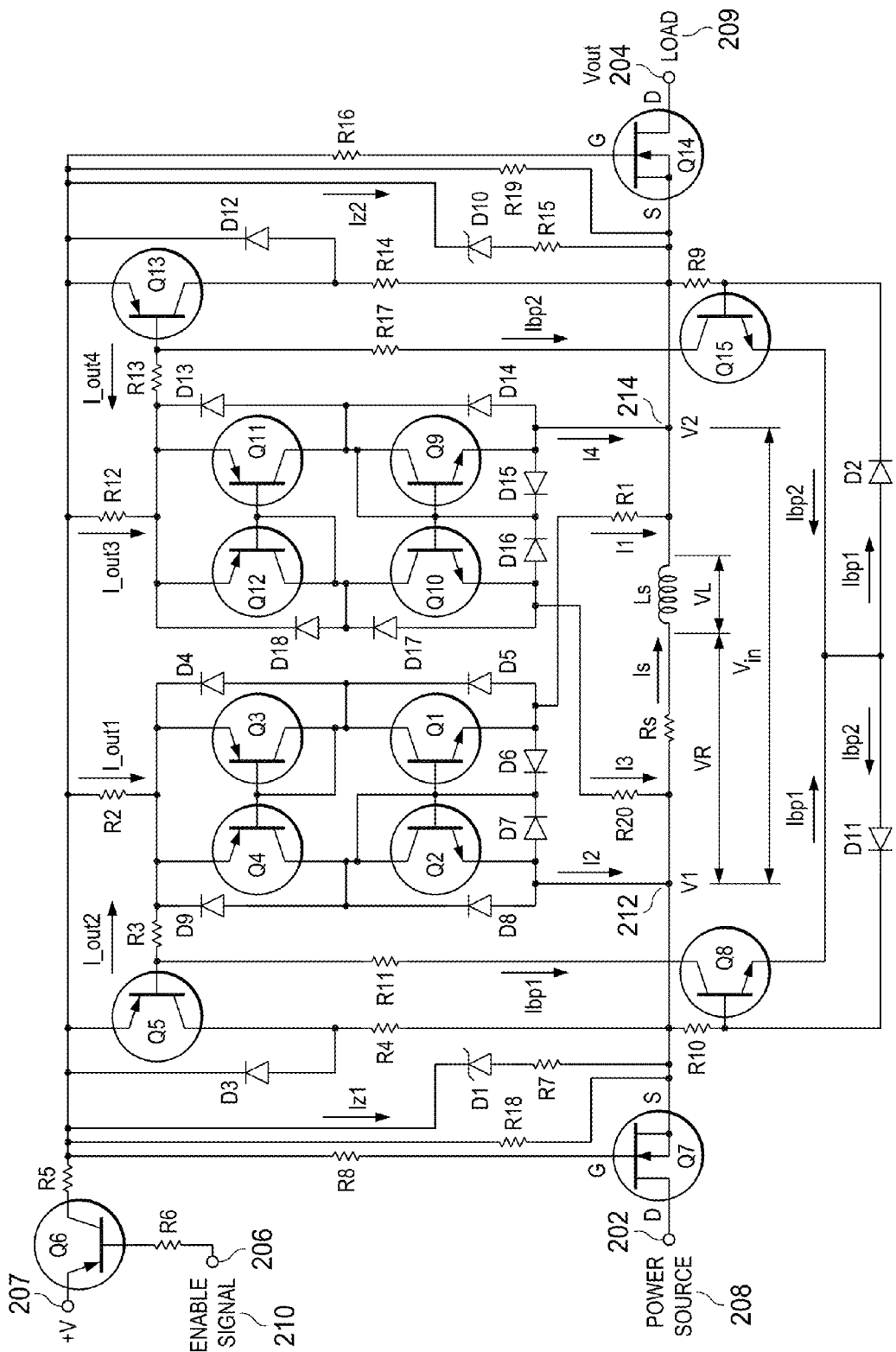
FIG. 9 is an illustration of a current limiter circuit system that limits current in two directions in accordance with an illustrative embodiment.

Turning now to FIG. 9, an illustration of a current limiter circuit system that limits current in two directions is depicted in accordance with an illustrative embodiment. In this illustrative example, current limiter circuit system 200 in FIG. 9 is a different configuration of current limiter circuit system 200 in FIG. 5. Current limiter circuit system 200 in FIG. 9 is configured for low side voltage sense, while current limiter circuit system 200 in FIG. 5 is configured for high side voltage sense.

The different configurations of current limiter circuit system 200 in FIGS. 2-9 are presented only for purposes of illustrating some implementations for current limiter circuit system 110 in FIG. 1. These illustrations are not meant to limit the manner in which other illustrative examples for current limiter circuit system 110 in FIG. 1 may be implemented.

For example, other types of transistors may be used in place of or in addition to the bipolar junction transistors for the current mirrors that are configured as current sources or current sinks. For example, field effect transistors may be used in place of bipolar junction transistors. In particular, metal oxide semiconductor field effect transistors (MOSFETs) may be used in place of bipolar junction transistors for transistors Q1-Q6 and Q9-Q13.

As another example, inductor Ls depicted in current limiter circuit system 200 in FIG. 3 may be omitted while using transistor Q8, resistor R9, resistor R11, resistor R11, and diode D2 for the voltage clamp for a transient sensing circuit. As another example, resistor Rs depicted in FIGS. 3-5 and FIGS. 7-9 may be removed while retaining inductor Ls to convert the current limiter circuit system into a current rate limiter circuit system. In another illustrative example, current limiter circuit system 200 in FIG. 3 may omit transistor Q8, resistor R9, resistor R10, resistor R11, and diode D2 while using inductor Ls to form a transient sensing circuit.

In still another illustrative example, other types of circuits may be used in place of or in addition to the current mirrors to cause a scaled current, such as the sum of I_out1 and I_out2, to flow. For example, operational amplifiers may be used, to cause I_out1 and I_out2 to flow in the different, examples. With operational amplifiers, a scaled voltage may be generated in place of the scaled current.

Figure 10:
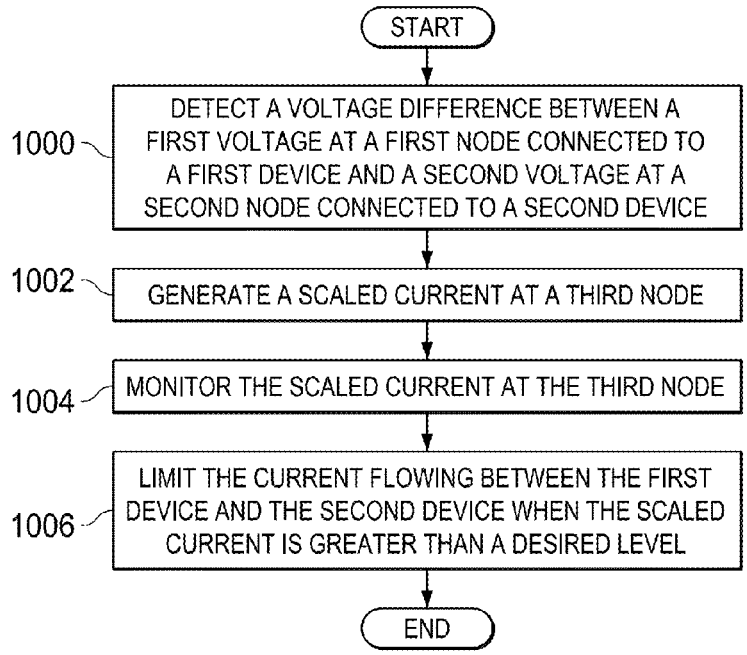
FIG. 10 is an illustration of a flowchart of a process for limiting a current between a first device and a second device in accordance with an illustrative embodiment.

Turning next to FIG. 10, an illustration of a flowchart of a process for limiting a current between a first device and a second device is depicted in accordance with an illustrative embodiment. The process illustrated in FIG. 10 may be implemented in current flow environment 100 in FIG. 1. In particular, the process may be implemented in current limiter circuit system 110 to limit the flow of current. 112 between first device 102 and second device 104 in FIG. 1.

The process begins by detecting a voltage difference between a first voltage at a first node connected to a first device and a second voltage at a second node connected to a second device (step 1000). As depicted, a steady state sensing circuit detects the voltage.

The process generates a scaled current at a third node (1002). In the illustrative example, the steady state sensing circuit, such as a current mirror system, causes the scaled current flow at the third node. For example, the scaled current may flow in a direction selected from one of out of the steady state sensing circuit and into the steady state sensing circuit. The scaled current is proportional to the voltage difference.

The process monitors the scaled current at the third node (step 1004). In step 1004, the monitoring is performed by a detection circuit. The detection circuit is connected to the third node in this example.

The process limits the current flowing between the first device and the second device when the scaled current is greater than a desired level (step 1006), with the process terminating thereafter. The limiting of the current is performed by the detection circuit controlling a switching circuit that connects the first device to the second device. The current flows between the first device and the second device through the switching circuit.

Figure 11:
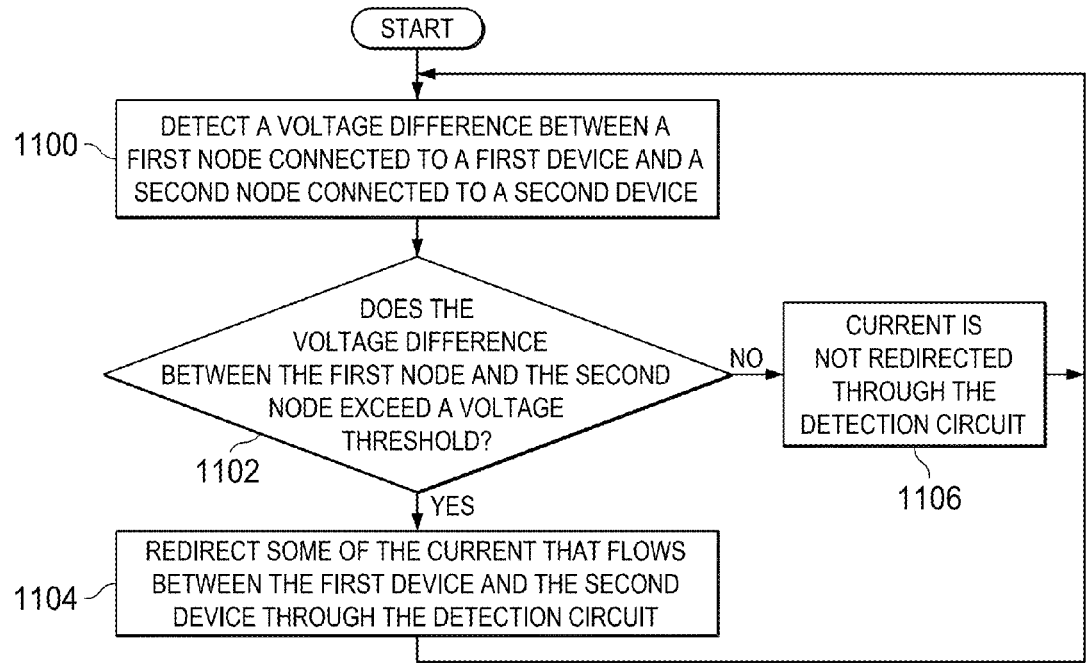
FIG. 11 is an illustration of a flowchart of a process for limiting a current between a first device and a second device when a transient current occurs in accordance with an illustrative embodiment.

With reference next to FIG. 11, an illustration of a flowchart of a process for limiting a current between a first device and a second device when a transient current occurs is depicted in accordance with an illustrative embodiment. The process illustrated in FIG. 11 may be implemented in current flow environment 100 in FIG. 1. In particular, the process may be implemented in transient sensing circuit 120 in current limiter circuit system 110 to limit the flow of current 112 between first device 102 and second device 104 in FIG. 1 when transient current 136 is occurs.

This process does not wait for a comparison of the right amount of current. The voltage is used to determine whether to limit the current.

The process begins by detecting a voltage difference between a first node connected to a first device and a second node connected to a second device (step 1100). The process determines whether the voltage difference between the first node and the second node exceeds a voltage threshold (step 1102).

If the voltage difference exceeds the voltage threshold, the process redirects some of the current that flows between the first device and the second device through the detection circuit (step 1104), with the process returning to step 1100. With reference again to step 1102, if the voltage difference does not exceed the voltage threshold, the process does not redirect some of the current through the detection circuit (step 1106), with the process then returning to step 1100.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented in hardware. This hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart o r block diagram.

Figure 12:
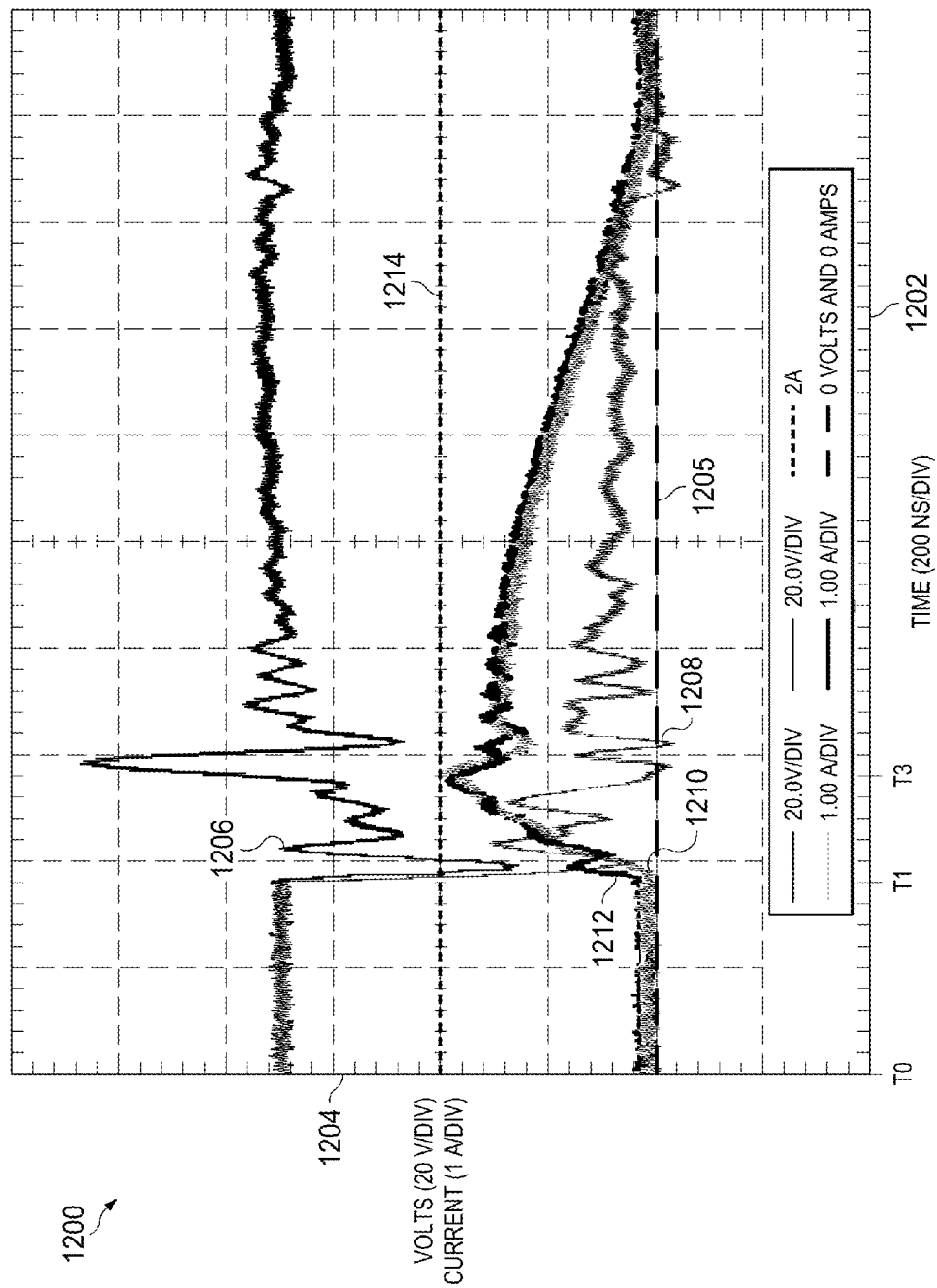
FIG. 12 is an illustration of a chart showing waveforms for a current limiter circuit system in accordance with an illustrative embodiment.

With reference now to FIG. 12, an illustration of a chart showing waveforms for a current limiter circuit system is depicted in accordance with an illustrative embodiment. In this illustrative example, chart 1200 illustrates waveforms for current limiter circuit system 200 as shown in FIG. 5. As depicted, abscissa 1202 is time and ordinate 1204 is voltage or current, depending on the waveform. Line 1205 is about 0 volts or 0 amps depending on the waveform. A slight positive offset is present from line 1205 for the 0 current references.

In this illustrative example, waveform 1206 is the input, voltage for power source 208 at connector 202, waveform 1208 is the voltage for load 209 at connector 204, waveform 1210 is the current from power source 208 at connector 202, and waveform 1212 is the current to load 209 at connector 204. These waveforms are measurements of the response of a current limiter circuit system 200 in FIG. 5 during operation of this circuit. In this example, a response to a load fault is shown.

Initially, at time T0, waveform 1206 shows the input voltage at about 70V and waveform 1208 shows the output voltage about 70V. Load 209 is initially open and does not pull a current and is shorted to ground at time T1 through a mercury switch in an effort to minimize the fault time and maximize the fault current in this example.

In the illustrative example, current limiter circuit system 200 in FIG. 5 is designed, to limit the output current in waveform 1212. In this example, the limit is about 2 A as shown by line 1214.

As shown by the waveforms, current limiter circuit system 200 begins to limit, the current at about 200 ns after the fault at time T3, when the current to load 209 in waveform 1212 reaches the design limit of about 2 A at line 1214. The current limiter circuit system 200 acts when the sum of the current and the current rate reach the voltage trigger threshold, reversing the current increase within a time period of about 40 ns through the transient sensing circuit and preventing any undesired current overshoot to load 209. The steady state sensing circuit then limits the current thereafter until the switch is disabled.

A feedback circuit, not shown in current limiter circuit system 200, disables the switch. The feedback circuit turns off transistor Q6. Voltage is removed from load 209 at a rate determined by resistor R18 within a time period of about 1.2 us.

Thus, one or more components in current limiter circuit system 110 in FIG. 1 and the different circuits shown in FIGS. 2-9 provide one or more technical solutions to manage current flow that may flow in both directions between two devices. For example, the different circuits shown for current limiter circuit system 110 are analog circuits that are configured in a manner to solve the technical problem of quickly limiting fault current without overshoot, with less power consumed, or with less space needed to manage the flow of current between two devices than is currently available.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a steady state sensing circuit comprising a first current mirror having a first input, a second input, a first output, and a second output, wherein the first input is connected to a first node, and the second input is connected to a second node; and a second current mirror having a first input, a second input, a first output, and a second output, wherein the first input of the second current mirror is connected to the first output of the first current mirror, the second input of the second current mirror is connected to the second output of the first current mirror, and the second output of the second current mirror is connected to a third node;
    wherein the first node is connected to a first device, the second node is connected to a second device, and the steady state sensing circuit causes a scaled current to flow at the third node and the scaled current is proportional to a voltage difference between the first node and the second node;
    a switching circuit, wherein the switching circuit limits an amount of current that flows between the first device and the second device; and
    a detection circuit connected to the third node and the switching circuit, wherein the detection circuit monitors the scaled current at the third node and controls the switching circuit to limit the amount of the current that flows between the first device and the second device when the scaled current that is being monitored is greater than a desired level.

2. The apparatus of claim 1 further comprising:
    a transient sensing circuit connected to the detection circuit, wherein the transient sensing circuit limits the amount of the current that flows between the first device and the second device when the current is a transient current.

3. The apparatus of claim 2, wherein the transient sensing circuit comprises:
    an inductor connected to the first node and the second node.

4. The apparatus of claim 2, wherein the transient sensing circuit comprises:
    a voltage clamp connected to the first node, the second node, and the detection circuit, wherein the voltage clamp redirects some of the current that flows between the first device and the second device through the detection circuit and bypasses the steady state sensing circuit when a voltage difference between the first node and the second node induced by the transient current exceeds a voltage threshold.

5. The apparatus of claim 1 further comprising:
an enable circuit connected to the steady state sensing circuit, the detection circuit, and the switching circuit, wherein the enable circuit enables and disables the current that flows between the first device and the second device.

6. The apparatus of claim 5, wherein the enable circuit comprises:
a transistor having a collector resistively connected to the switching circuit and a base resistively connected to an enable signal, wherein the enable signal causes the current to flow to the switching circuit that enables a flow of the current between the first device and the second device.

7. The apparatus of claim 1, wherein the scaled current flows at the third node in a direction selected from one of out of the steady state sensing circuit and into the steady state sensing circuit.

8. The apparatus of claim 1, wherein the first device is a power source and the second device is a load.

9. The apparatus of claim 1, wherein the apparatus controls a flow of the current in a direction selected from at least one of from the first device to the second device or from the second device to the first device.

10. A current limiter circuit system comprising:
a steady state sensing circuit comprising:
a first current mirror having a first input, a second input, a first output, and a second output, wherein the first input is connected to a first node, and the second input is connected to a second node; and
a second current mirror having a first input, a second input, a first output, and a second output, wherein the first input of the second current mirror is connected to the first output of the first current mirror, the second input of the second current mirror is connected to the second output of the first current mirror, and the second output of the second current mirror is connected to a third node;
wherein the first node is connected to a power source, the second node is connected to a load, and a scaled current flows at the third node and the scaled current is proportional to a voltage difference between the first node and the second node;
a switching circuit, wherein the switching circuit limits an amount of current that flows between the power source and the load;
a detection circuit connected to an output of the steady state sensing circuit and the switching circuit, wherein the detection circuit monitors the scaled current at the third node and controls the switching circuit to limit the amount of the current that flows between the power source and the load when the scaled current that is being monitored is greater than a desired level;
a transient sensing circuit connected to the first node, the second node, and the detection circuit, wherein the transient sensing circuit limits the amount of the current that flows between the power source and the load when the current is a transient current that has a level that is greater than desired; and
an enable circuit connected to the steady state sensing circuit, the detection circuit, and the switching circuit, wherein the enable circuit enables and disables the current that flows between the power source and the load.

11. The current limiter circuit system of claim 10, wherein the scaled current flows in a direction selected from one of into the third node and out of the third node.

12. The current limiter circuit system of claim 10, wherein the transient sensing circuit comprises:
an inductor connected to the first node and the second node.

13. The current limiter circuit system of claim 10, wherein the transient sensing circuit comprises:
a voltage clamp connected to the first node, the second node, and the detection circuit, wherein the voltage clamp redirects some of the current that flows between a first device and a second device through the detection circuit and bypasses the steady state sensing circuit when a voltage difference between the first node and the second node induced by the transient current exceeds a voltage threshold.

14. An apparatus comprising:
a steady state sensing circuit comprising a first current mirror having a first input, a second input, a first output, and a second output, wherein the first output is connected to a first node, and the second output is connected to a second node; and a second current mirror having a first input, a second input, a first output, and a second output, wherein the first output of the second current mirror is connected to the first output of the first current mirror, the second output of the second current mirror is connected to the second input of the first current mirror, and the second output of the second current mirror is connected to a third node;
wherein the first node is connected to a first device, the second node is connected to a second device, and the steady state sensing circuit causes a scaled current to flow at the third node and the scaled current is proportional to a voltage difference between the first node and the second node;
a switching circuit, wherein the switching circuit limits an amount of current that flows between the first device and the second device; and
a detection circuit connected to the third node and the switching circuit, wherein the detection circuit monitors the scaled current at the third node and controls the switching circuit to limit the amount of the current that flows between the first device and the second device when the scaled current that is being monitored is greater than a desired level.

15. A current limiter circuit system comprising:
a steady state sensing circuit comprising:
a first current mirror having a first input, a second input, a first output, and a second output, wherein the first output is connected to a first node and the second output is connected to a second node; and
a second current mirror having a first input, a second input, a first output, and a second output, wherein the first output of the second current mirror is connected to the first input of the first current mirror, the second output of the second current mirror is connected to the second input of the first current mirror, and the second output of the second current mirror is connected to a third node;
wherein the first node is connected to a power source, the second node is connected to a load, and a scaled current flows at the third node and the scaled current is proportional to a voltage difference between the first node and the second node;
a switching circuit, wherein the switching circuit limits an amount of current that flows between the power source and the load;
a detection circuit connected to an output of the steady state sensing circuit and the switching circuit, wherein the detection circuit monitors the scaled current at the third node and controls the switching circuit to limit the amount of the current that flows between the power source and the load when the scaled current that is being monitored is greater than a desired level;

a transient sensing circuit connected to the first node, the second node, and the detection circuit, wherein the transient sensing circuit limits the amount of the current that flows between the power source and the load when the current is a transient current that has a level that is greater than desired; and an enable circuit connected to the steady state sensing circuit, the detection circuit, and the switching circuit, wherein the enable circuit enables and disables the current that flows between the power source and the load.

* * * * *